United States Patent [19]
Chong et al.

[11] Patent Number: 6,119,141
[45] Date of Patent: Sep. 12, 2000

[54] RESISTIVE DECOUPLING OF FUNCTION SELECTION SIGNALS FROM INPUT MULTIPLEXERS IN ARITHMETIC LOGICAL UNITS ALU

[75] Inventors: Yew Keong Chong; Prashant Shamarao, both of Altanta, Ga.

[73] Assignee: Integrated Device Technology, Inc., Santa Clara, Calif.

[21] Appl. No.: 09/073,693

[22] Filed: May 6, 1998

[51] Int. Cl.[7] .................................. G06F 7/50; G06F 7/38
[52] U.S. Cl. .................... 708/707; 708/230; 708/234
[58] Field of Search ..................................... 708/230, 234, 708/630, 603, 670, 707

[56] References Cited

U.S. PATENT DOCUMENTS

| | | | |
|---|---|---|---|
| 4,157,589 | 6/1979 | Kapral et al. | 364/716 |
| 4,454,589 | 6/1984 | Miller | 364/716 |
| 4,559,608 | 12/1985 | Young et al. | 364/786 |
| 4,683,548 | 7/1987 | Mlynek | 708/707 |
| 5,136,536 | 8/1992 | Ng | 364/748 |
| 5,185,714 | 2/1993 | Nakayama | 708/603 |
| 5,329,477 | 7/1994 | Kudou | 708/706 |
| 5,818,743 | 10/1998 | Lee et al. | 708/630 |
| 5,818,746 | 10/1998 | Kentish | 708/670 |

OTHER PUBLICATIONS

Tinder, "Digital Engineering Design: A Modern Approach", Prentice–Hall, Inc., 1991, pp. 275–277.

*Primary Examiner*—Tan V. Mai
*Attorney, Agent, or Firm*—Myers Bigel Sibley & Sajovec

[57] ABSTRACT

The function selection signal of an ALU is resistively decoupled or serially coupled to the input multiplexers of the ALU. By producing delayed function selection signals and decoupling the delayed function signals from the input multiplexers, the input multiplexers are serially activated. This need not impact the overall speed of the ALUs, since the adders are also serially activated by virtue of the carry signal ripple. However, by resistively decoupling the function selection signal from the input multiplexers, the load seen by the input driver that drives the function selection signal inputs of the multiplexer may be reduced, thereby allowing the least significant bit input multiplexer to be activated more rapidly. Moreover, resistive decoupling may be implemented by polysilicon resistors, thereby allowing metal interconnect layers in the integrated circuit to be used for other purposes.

31 Claims, 2 Drawing Sheets

RESISTIVE DECOUPLING OF FUNCTION SELECTION SIGNALS FROM INPUT MULTIPLEXERS IN ARITHMETIC LOGICAL UNITS ALU

FIELD OF THE INVENTION

This invention relates to data processing systems and methods, and more particularly to arithmetic logical units (ALU).

BACKGROUND OF THE INVENTION

ALUs are widely used in central processing units of data processing systems including but not limited to microprocessors. As is well known to those having skill in the art, an ALU is the unit that performs arithmetic commands, such as adding, subtracting, multiplying and dividing, and logical commands such as OR, AND and NOT. As the speed of data processing systems continues to increase, and the integration density of integrated circuits continues to grow, it is generally desirable to provide high speed ALUs that can consume reduced area in an integrated circuit.

As is well known to those having skill in the art, an ALU generally includes a plurality of input multiplexers that are responsive to a function selection signal. The function selection signal indicates which one of a predetermined number of logical functions is to be performed. Each input multiplexer is coupled to at least two data input signals, so that the function selection signal causes the input multiplexer to produce a selected logical function of the data input signals. A plurality of adders are responsive to the plurality of input multiplexers, to perform addition on the selected logical function of the data input signals.

More specifically, ALUs may be designed in a bit-slice implementation wherein an input multiplexer and an adder are responsive to a predetermined bit of first and second data input signals. Each of the input multiplexers is responsive to the function selection signal, to produce the selected logical function of the associated bit. Each adder is coupled to a corresponding multiplexer, and the carry output of a preceding adder is coupled to the carry input of a succeeding adder. Accordingly, an input multiplexer and an adder may be provided for each bit of data input signal, from a least significant bit (LSB) to a most significant bit (MSB). The adders are interconnected so that the carry input of a given bit is connected to the carry output of a preceding bit.

It will be understood that in order to perform the entire set of sixteen arithmetic and logical functions of two bits, each input multiplexer may comprise a plurality of input multiplexers, and the function selection signal may be a four-bit function selection signal that is coupled to the multiplexers. The design of an ALU as described above is well known to those having skill in the art. See for example, the textbook entitled "*Digital Engineering Design, a Modern Approach*" by Richard F. Tinder, Prentice-Hall, 1991, pp. 275–277, the disclosure of which is hereby incorporated herein by reference.

Notwithstanding the above-described ALU design, it is generally desirable to allow further increases in ALU speed and integration density.

SUMMARY OF THE INVENTION

The present invention includes ALUs and ALU controlling methods that can provide high-speed, high-density ALUs by resistively decoupling the function selection signal from the higher order bit input multiplexers. Stated differently, the function selection signal is serially coupled to the input multiplexers, beginning with the least significant bit. By producing delayed function selection signals and coupling the delayed function selection signals to the plurality of input multiplexers, the input multiplexers are serially activated. Since the adders also are serially activated by virtue of the carry signal ripple from the least significant bit to the most significant bit, the delay need not impact the overall speed of the ALU. However, by resistively decoupling the function selection signal from the higher order bit input multiplexers, the load seen by the input driver that drives the function selection signal inputs of the multiplexer may be reduced, thereby allowing the least significant bit input multiplexer to be activated more rapidly. The least significant bit input multiplexer is preferably directly coupled to the function selection signal. Accordingly, processing of the least significant bit can begin earlier, so that the overall speed of the ALU can be increased.

Moreover, in integrated circuit implementations, resistive decoupling may be implemented by polysilicon resistors. As is well known to those having skill in the art, integrated circuits generally include at least one metal interconnection layer and at least one polysilicon interconnection layer. By using a portion of the at least one polysilicon interconnection layer to couple the function selection signal to the plurality of input multiplexers, the metal layers can be used for other purposes, thereby conserving integrated circuit area and allowing an increase in integration density.

Conventionally, metal lines are used to couple the function selection signal to the plurality of input multiplexers, in order to minimize the delay along these lines. The present invention stems from the realization that metal lines need not be used because delay among the multiplexers is acceptable, since there is inherently a delay among the adders. Thus, polysilicon resistive decoupling may be used to reduce the loading of the input multiplexers on the function selection signal and to allow the metal interconnection layer to be used for other purposes, such as local data routing.

More specifically, ALUs according to the invention include a plurality of input multiplexers that are responsive to a function selection signal to produce a selected logical function of the data input signals, wherein the function selection signal is resistively decoupled or serially coupled to the plurality of input multiplexers. A plurality of adders are responsive to the plurality of resistively decoupled or serially coupled input multiplexers, to perform addition on the selected logical function of the data input signals. By resistively decoupling or serially coupling the function selection signal to the plurality of input multiplexers, the function selection signal is applied to succeeding input multiplexers after a predetermined delay, rather than applied to all of the input multiplexers simultaneously.

In a preferred embodiment, the function selection signal is resistively decoupled or serially coupled to the input multiplexers by providing a plurality of resistors, a respective one of which is coupled between a respective pair of function selection inputs. The function selection signal is directly coupled to the least significant bit input multiplexer. More preferably, the resistors are polysilicon resistors that comprise a portion of at least one polysilicon interconnection layer in an integrated circuit ALU. At least two of the plurality of resistors may be of different resistance value, to thereby vary the delay between succeeding input multiplexers.

Accordingly, ALUs are controlled by repeatedly delaying the function selection signal and coupling the function selection signals so delayed to the plurality of multiplexers. The function selection signal is thereby delayed between the input multiplexers. All of the input multiplexers therefore need not load the data input signal driver, so that the first multiplexer can be activated more rapidly. Moreover, the resistors may be fabricated of polysilicon, to thereby conserve valuable integrated circuit space.

DETAILED DESCRIPTION OF PREFERRED EMBODIMENTS

Figure 1:
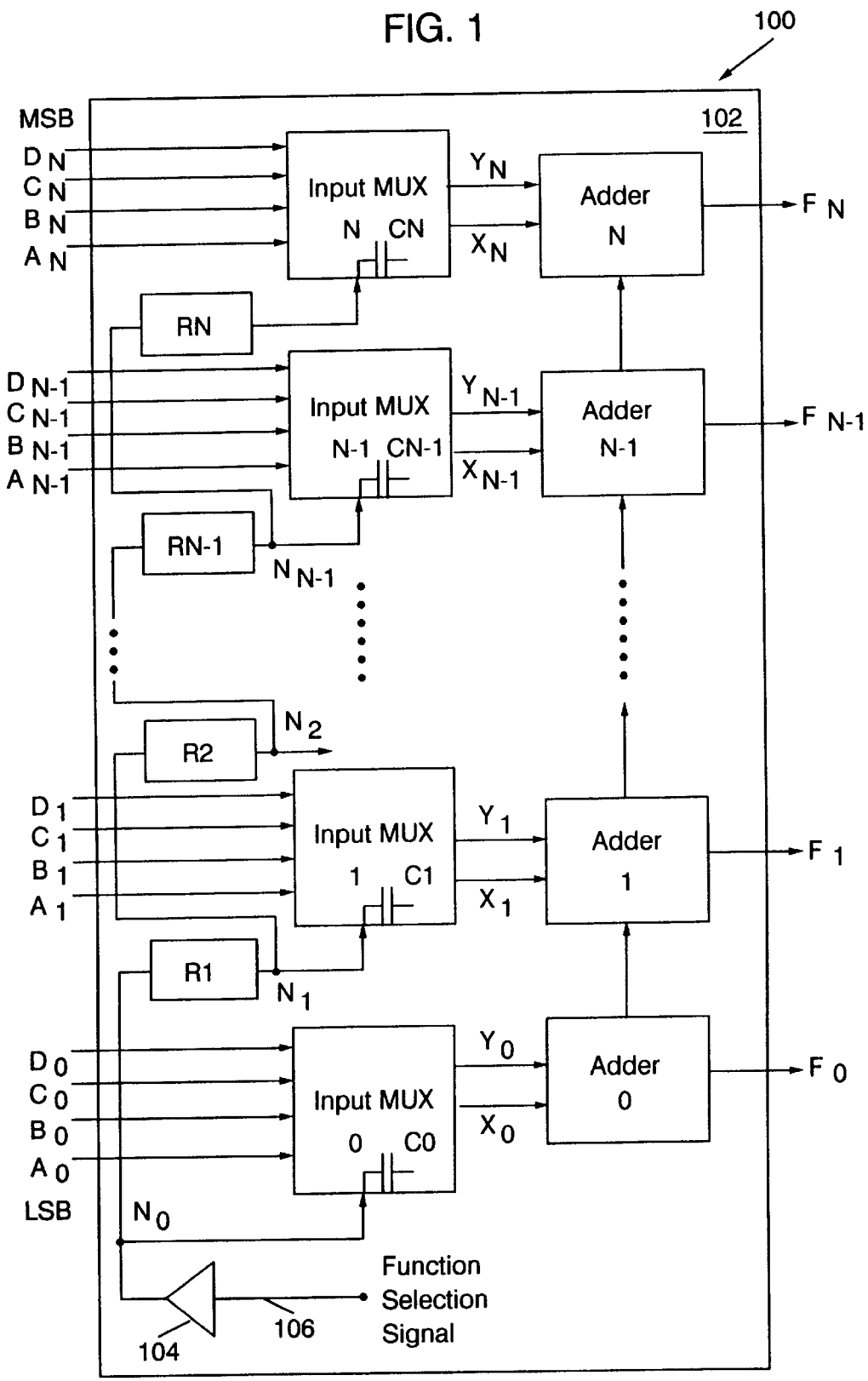
FIG. 1 is a block diagram of ALUs and ALU controlling methods according to the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element is referred to as being coupled to another element, it can be directly coupled to the other element or intervening elements may also be present.

FIG. 1 is a block diagram of ALUs and ALU controlling methods according to the invention. As shown in FIG. 1, ALU 100 may be integrated in an integrated circuit 102. The ALU 100 may comprise an entire ALU integrated circuit. Alternatively, ALU 100 may comprise a portion of a CPU integrated circuit, such as a microprocessor integrated circuit. In yet another alternative, the components of the ALU 100 can be provided as separate discrete or integrated circuits.

As shown in FIG. 1, ALU 100 operates in a bit slice manner, wherein a predetermined bit of data input signals is applied to a selected one of a plurality of input multiplexers. Accordingly, a plurality of input multiplexers INPUT MUX 0 . . . INPUT MUX N are provided, a respective one of which produces a selected logical function of respective data input signals $A_0 \ldots A_N$, $B_0 \ldots B_N$, $C_0 \ldots C_N$ and $D_0 \ldots D_N$. As shown, bits $A_0$, $B_0$, $C_0$ and $D_0$ are the least significant bits (LSB) and bits $A_N$, $B_N$, $C_N$ and $D_N$ are the most significant bits (MSB) of the data input signals. Each of the multiplexers is responsive to a function selection signal 106 that is buffered by an input driver 104.

Still referring to FIG. 1, a plurality of adders, ADDER 0 . . . ADDER N is provided, wherein a respective adder is responsive to a respective input multiplexer, to perform addition on the selected arithmetic and logical function of the data input signals, represented by the outputs $X_0 \ldots X_N$ and $Y_0 \ldots Y_N$ of the input multiplexers. As also shown in FIG. 1, the adders are also interconnected so that the carry input of a succeeding adder is responsive to the carry output of a preceding adder. Thus, for example, the carry output of ADDER 0 is coupled to the carry input of ADDER 1. The adders produce a plurality of data output signals $F_0 \ldots F_N$ that are an arithmetic logical function of the input signals A, B, C and D.

It will be understood that although the input signals A, B, C and D and the output signals F are illustrated in FIG. 1 as extending outside the integrated circuit 102, these signals may each originate within the integrated circuit when the ALU 100 is one functional component of the integrated circuit 102. Similarly, the function selection signal 106 is shown as originating from within the integrated circuit 102. However, the function selection signal 106 can also originate from external to the integrated circuit. It will also be understood that although some connections between the input multiplexers, adders and function selection signal are illustrated with a single line, a plurality of lines forming a bus may also be used to interconnect these elements. For example, in order to perform all sixteen logical functions of four bits, the function selection signal 106 preferably is a four-bit function selection signal that is coupled to each of the input multiplexers.

As also shown in FIG. 1, function signal selection 106 is coupled to each of the input multiplexers INPUT MUX 0 . . . INPUT MUX N, so that each input multiplexer performs the same logical function on the associated bit of the data input signals. Conventionally, metal lines are used to connect the driver 104 to each of the input multiplexers INPUT MUX 0 . . . INPUT MUX N in order to minimize the delay in applying the function selection signal 106 to the input multiplexers. Stated differently, conventionally, the function selection signal is applied simultaneously or in parallel to each of the input multiplexers INPUT MUX 0 . . . INPUT MUX N.

In contrast, according to the present invention and as illustrated in FIG. 1, the function selection signal 106 is resistively decoupled from the plurality of input multiplexers INPUT MUX 1 . . . INPUT MUX N, except for the least significant input multiplexer INPUT MUX 0. More specifically, a plurality of resistors R1 . . . RN is provided, a respective one of which is coupled between a respective pair of input multiplexers, in particular, to the function selection inputs of the input multiplexers. Stated differently, the plurality of serially connected resistors R1 . . . RN define a plurality of intermediate nodes $N_1 \ldots N_{N-1}$ therebetween, and a respective intermediate node is coupled to a function selection input of a respective input multiplexer INPUT MUX 0 . . . INPUT MUX N. As described above, in a preferred embodiment, resistive decoupling is not used to INPUT MUX 0, so that the function selection signal is applied to INPUT MUX 0 as rapidly as possible.

As illustrated in FIG. 1, a resistor R1 . . . RN and the associated input capacitance C1 . . . CN of the function selection input of the input multiplexer INPUT MUX 0 . . . INPUT MUX N forms a resistor capacitor (RC) delay, to thereby delay the application of function selection signal 106 to each succeeding INPUT MUX N. Thus, the function selection signal 106 is serially applied to the INPUT MUX 0 . . . INPUT MUX N, preferably from the LSB to the MSB. By providing RC decoupling between the function selection signal driver 104 and the input multiplexers, the driver 104 does not need to drive the full gate load of all of the input multiplexers. Because the driver 104 conventionally sees the load of all the multiplexers, application of the function signal to the first input multiplexer may be delayed. In contrast, according to the invention, the input driver 104 does not drive the full load of all of the input multiplexers, so that the first input multiplexer INPUT MUX 0 can be driven quickly.

The present invention takes advantage of the fact that the timing of the ALU generally involves a delay from the LSB to the MSB as the carry signal propagates through the adders. Accordingly, the speed of the ALU can be increased by more rapidly applying the function selection signal 106 to the first input multiplexer INPUT MUX 0. This may be accomplished according to the invention by resistively decoupling the remaining input multiplexers INPUT MUX 1 . . . INPUT MUX N from the function selection signal driver 104. The function selection signal will thus be applied to succeeding input multiplexers with increasing delay. However, as long as the total delay is less than the total delay of the adders, the speed of the ALU need not be degraded.

In order to provide resistive decoupling between the input multiplexers, a plurality of resistors R1 . . . RN are used. In integrated circuit technology, these resistors are preferably formed from a polycrystalline silicon (polysilicon) layer that is generally included in integrated circuits as a lower interconnect layer. Typically, this layer is also used to form the gates of field effect transistors that are used in the integrated circuit.

Polysilicon resistors sharply contrast from conventional metal interconnection layers of integrated circuits. Although any interconnection layer has some resistance, metal layers in an integrated circuit may be generally considered as having negligible sheet resistance, on the order of 50 mΩ/□. In contrast, polysilicon layers can be designed to have appreciable sheet resistance, on the order of 20Ω/□.

It will be understood that metal may be used to connect the polysilicon resistors R1 . . . RN to the respective input multiplexers, as shown in FIG. 1. However, the resistance of these connections may be dominated by the polysilicon resistors. In another alternative, the entire path between the function selection signal input driver 104 and the respective input multiplexers INPUT MUX 0 . . . INPUT MUX N may be formed of polysilicon.

The polysilicon resistors can provide another advantage according to the invention. Specifically, by providing the interconnection between the input multiplexers in the polysilicon layer of an integrated circuit, additional area is made available for use in the metal interconnection layers of the integrated circuit. Thus, metal lines need not be used for routing channels to the input multiplexers, and can, therefore, be used for other purposes in the integrated circuit. Higher degrees of integration may thereby be provided. However, in other alternatives, resistors other than polysilicon, such as resistors formed of field effect transistors, may be used to resistively decouple the input multiplexers.

The length and width of the polysilicon resistors R1 . . . RN can all be equal, to provide equal resistivity and equal delay between input multiplexers. Alternatively, the width and/or length of the polysilicon lines that make up resistors R1 . . . RN may be selected such that the RC delay from the LSB to the MSB is lower than the associated delay through the adders from the LSB to the MSB. Thus, the delay through the adders can remain the same, while the initiation of the addition process can occur earlier, leading to an overall increase in speed.

For example, when the value of each of resistors R1 . . . RN is 2125 ohms and the value of C is 16 ff, for a power supply voltage of 2.8 v, an 8-bit addition speed-up of 0.13 nsec may be obtained due to the decoupling effects of the resistances. The value of C may include the line capacitance in addition to the gate load on the line. The rise time of $N_0$ from 0.2 v to 2.4 v can be 0.25 nsec with the resistances and 0.36 nsec without the resistances.

Figure 2:
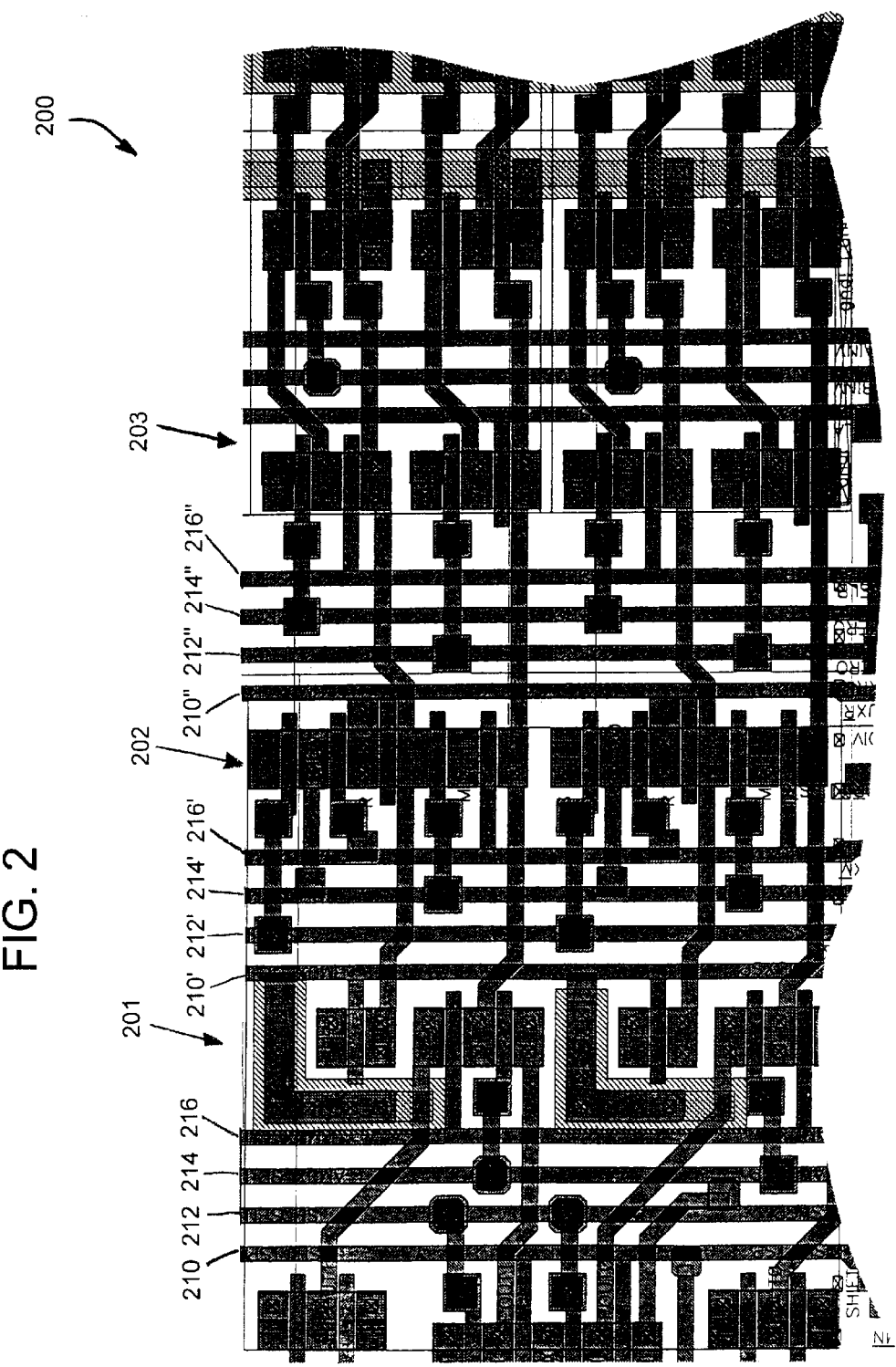
FIG. 2 is a top view of a portion of an integrated circuit ALU employing resistive coupling according to the present invention.

FIG. 2 is a layout of a portion of an integrated circuit ALU 200 employing resistive decoupling according to the present invention. As shown in FIG. 2, each input multiplexer comprises a cascade of three multiplexers 201, 202, 203. For example, a cascade of a 4:1 multiplexer, a 3:1 multiplexer and a 3:1 multiplexer may be provided. Four polysilicon lines 210–216, 210'–216' and 210"–216" are coupled to the respective input multiplexers.

Resistive decoupling according to the invention can take advantage of the timing of the ALU to select input multiplexers. By using a polysilicon layer for routing the control signals to the ALU input multiplexers, integrated circuit size can be reduced and at least a portion of the metal interconnect layers can be used for other purposes. Moreover, the ALU worst case speed path can be improved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An arithmetic logical unit (ALU), comprising:

a plurality of input multiplexers that are responsive to a function selection signal to produce a selected logical function of the data input signals, wherein the function selection signal is resistively decoupled from the plurality of input multiplexers; and a plurality of adders that are responsive to the plurality of resistively decoupled input multiplexers, to perform addition on the selected logical function of the data input signals.

2. An ALU according to claim 1:

wherein the plurality of input multiplexers each includes a function selection input;

the ALU further comprising a plurality of resistors, a respective one of which is coupled between a respective pair of function selection inputs; and wherein the function selection signal is coupled to at least one of the resistors to thereby resistively decouple the function selection signal from the plurality of input multiplexers.

3. An ALU according to claim 2 wherein the plurality of resistors are a plurality of polysilicon resistors.

4. An ALU according to claim 3 wherein the ALU is an integrated circuit ALU, the integrated circuit ALU including at least one metal interconnection layer and at least one polysilicon interconnection layer, and wherein the plurality of polysilicon resistors comprise a portion of the at least one polysilicon interconnection layer.

5. An ALU according to claim 2 wherein at least two of the plurality of resistors are of different resistance values.

6. An ALU according to claim 1 wherein one of the input multiplexers corresponds to a Least Significant Bit (LSB) of the data input signals; wherein the input multiplexer corresponding to the LSB is directly coupled to the function selection signal and wherein the function selection signal is resistively decoupled from remaining input multiplexers.

7. An arithmetic logical unit (ALU), comprising:

a plurality of input multiplexers that are responsive to a function selection signal to produce a selected logical function of the data input signals, wherein the function selection signal is serially coupled to the plurality of input multiplexers; and a plurality of adders that are responsive to the plurality of serially coupled input multiplexers, to perform addition on the selected logical function of the data input signals.

8. An ALU according to claim 7:

wherein the plurality of input multiplexers each includes a function selection input;

the ALU further comprising a plurality of resistors, a respective one of which is coupled between a respective pair of function selection inputs; and wherein the function selection signal is coupled to at least one of the resistors to thereby serially couple the function selection signal to the plurality of input multiplexers.

9. An ALU according to claim 8 wherein the plurality of resistors are a plurality of polysilicon resistors.

10. An ALU according to claim 9 wherein the ALU is an integrated circuit ALU, the integrated circuit ALU including at least one metal interconnection layer and at least one polysilicon interconnection layer, and wherein the plurality of polysilicon resistors comprise a portion of the at least one polysilicon interconnection layer.

11. An ALU according to claim 8 wherein at least two of the plurality of resistors are of different resistance values.

12. An ALU according to claim 7 wherein one of the input multiplexers corresponds to a Least Significant Bit (LSB) of the data input signals; wherein the input multiplexer corresponding to the LSB is directly coupled to the function selection signal and wherein the function selection signal is serially coupled to remaining input multiplexers.

13. An arithmetic logical unit (ALU), comprising:

a plurality of input multiplexers, each of which is responsive to a function selection input and to data input signals to produce a selected logical function of the data input signals;

a plurality of polysilicon resistors, a respective one of which is coupled between a respective pair of function selection inputs, wherein a function selection signal is coupled to at least one of the polysilicon resistors; and a plurality of adders that are responsive to the plurality of serially coupled input multiplexers, to perform addition on the selected logical function of the data input signals.

14. An ALU according to claim 13 wherein the ALU is an integrated circuit ALU, the integrated circuit ALU including at least one metal interconnection layer and at least one polysilicon interconnection layer, and wherein the plurality of polysilicon resistors comprise a portion of the at least one polysilicon interconnection layer.

15. An ALU according to claim 13 wherein at least two of the plurality of polysilicon resistors are of different resistance values.

16. An ALU according to claim 13 wherein one of the input multiplexers corresponds to a Least Significant Bit (LSB) of the data input signals; wherein the input multiplexer corresponding to the LSB is directly coupled to the function selection signal and wherein the function selection signal is coupled to remaining in put multiplexers via the plurality of polysilicon resistors.

17. An arithmetic logical unit (ALU), comprising:

means for multiplexing data input signals in response to a function selection signal to produce a selected logical function of the data input signals;

means for performing addition on the selected logical function of the data input signals so produced; and means for producing a plurality of delayed function selection signals and for supplying the plurality of delayed function selection signals to the multiplexing means.

18. An ALU according to claim 17 wherein the means for producing a plurality of delayed function selection signals comprises a plurality of serially connected resistors, that define a plurality of intermediate nodes therebetween, at least one of the intermediate nodes being coupled to the means for multiplexing, and wherein the function selection signal is coupled to at least one of the resistors.

19. An ALU according to claim 18 wherein the plurality of resistors are a plurality of polysilicon resistors.

20. An ALU according to claim 19 wherein the ALU is an integrated circuit ALU, the integrated circuit ALU including at least one metal interconnection layer and at least one polysilicon interconnection layer, and wherein the plurality of polysilicon resistors comprise a portion of the at least one polysilicon interconnection layer.

21. An ALU according to claim 18 wherein at least two of the plurality of resistors are of different resistance values.

22. An ALU according to claim 17 wherein one of the input multiplexers corresponds to a Least Significant Bit (LSB) of the data input signals and wherein the producing means comprises means for directly supplying the function selection signal to the input multiplexer corresponding to the LSB and for supplying the plurality of delayed function selection signals to remaining input multiplexers.

23. A method of controlling an arithmetic logical unit (ALU), the ALU comprising a plurality of input multiplexers that are responsive to a function selection signal to produce a selected arithmetic and logical function of the data input signals and a plurality of adders that are responsive to the plurality of input multiplexers, to perform addition on the selected arithmetic and logical function of the data input signals, the ALU controlling method comprising the step of:

resistively decoupling the function selection signal from the plurality of input multiplexers.

24. A method according to claim 23 wherein the resistively decoupling step comprises the step of resistively decoupling the function selection signal to the plurality of input multiplexers with resistors of different resistance values.

25. A method according to claim 23 wherein one of the input multiplexers corresponds to a Least Significant Bit (LSB) of the data input signals and wherein the resistively decoupling step comprises the steps of:

directly coupling the function selection signal to the input multiplexer corresponding to the LSB; and resistively decoupling the function selection signal to remaining input multiplexers.

26. A method of controlling an arithmetic logical unit (ALU), the ALU comprising a plurality of input multiplexers that are responsive to a function selection signal to produce a selected arithmetic and logical function of the data input signals and a plurality of adders that are responsive to the plurality of input multiplexers, to perform addition on the selected arithmetic and logical function of the data input signals, the ALU controlling method comprising the step of:

serially coupling the function selection signal to the plurality of input multiplexers.

27. A method according to claim 26 wherein the serially coupling step comprises the step of serially coupling the function selection signal to the plurality of input multiplexers with different delays.

28. A method according to claim 26 wherein one of the input multiplexers corresponds to a Least Significant Bit (LSB) of the data input signals and wherein the serially coupling step comprises the steps of:

directly coupling the function selection signal to the input multiplexer corresponding to the LSB; and serially coupling the function selection signal to remaining input multiplexers.

29. A method of controlling an arithmetic logical unit (ALU), the ALU comprising a plurality of input multiplexers that are responsive to a function selection signal to produce a selected arithmetic and logical function of the data input signals and a plurality of adders that are responsive to the plurality of input multiplexers, to perform addition on the selected arithmetic and logical function of the data input signals, the ALU controlling method comprising the step of:

repeatedly delaying the function selection signal; and coupling a respective one of the function selection signals so delayed, to a respective one of the input multiplexers.

30. A method according to claim 29 wherein the repeatedly delaying step comprises the step of repeatedly delaying the function selection signal by delays of different values.

31. A method according to claim 29 wherein one of the input multiplexers corresponds to a Least Significant Bit (LSB) of the data input signals; the ALU controlling method further comprising the step of:

directly coupling the function selection signal to the input multiplexer corresponding to the LSB; and wherein the coupling step comprises the step of coupling a respective one of the function selection signals so delayed, to remaining ones of the input multiplexers.

* * * * *